US 8,213,523 B2

(12) United States Patent
Birru et al.

(10) Patent No.: US 8,213,523 B2
(45) Date of Patent: Jul. 3, 2012

(54) COST-EFFECTIVE PREAMBLE STRUCTURE FOR HIGH-SPEED COMMUNICATION OF PACKETIZED SYSTEMS

(75) Inventors: Dagnachew Birru, Yorktown Heights, NY (US); Seyed-Alireza Seyedi-Esfahani, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 632 days.

(21) Appl. No.: 12/441,634

(22) PCT Filed: Sep. 27, 2007

(86) PCT No.: PCT/IB2007/053934
§ 371 (c)(1),
(2), (4) Date: Mar. 17, 2009

(87) PCT Pub. No.: WO2008/038248
PCT Pub. Date: Apr. 3, 2008

(65) Prior Publication Data
US 2010/0124294 A1    May 20, 2010

Related U.S. Application Data

(60) Provisional application No. 60/827,480, filed on Sep. 29, 2006.

(51) Int. Cl.
*H04K 1/10*    (2006.01)

(52) U.S. Cl. ........ 375/260; 375/259; 375/295; 375/299; 375/316; 375/377; 370/331; 370/335

(58) Field of Classification Search .................. 375/260, 375/259, 295, 299, 316, 377; 370/331, 334, 370/335
See application file for complete search history.

(56) References Cited

U.S. PATENT DOCUMENTS

| | | | |
|---|---|---|---|
| 8,005,153 B2 * | 8/2011 | Muharemovic et al. ...... | 375/259 |
| 2005/0226140 A1 * | 10/2005 | Zhuang et al. ................ | 370/203 |
| 2006/0050799 A1 * | 3/2006 | Hou et al. ..................... | 375/260 |
| 2006/0056528 A1 * | 3/2006 | Jung et al. ..................... | 375/260 |
| 2006/0291431 A1 * | 12/2006 | Pajukoski et al. ............. | 370/335 |
| 2007/0189404 A1 * | 8/2007 | Baum et al. ................... | 375/260 |
| 2007/0291696 A1 * | 12/2007 | Zhang et al. .................. | 370/331 |
| 2008/0123616 A1 * | 5/2008 | Lee .............................. | 370/344 |

* cited by examiner

*Primary Examiner* — Kenneth Lam
(74) *Attorney, Agent, or Firm* — Larry Liberchuk (57) ABSTRACT

The system (700), apparatus (600), and method of the present invention provide an hierarchical pseudo-circularly symmetric and full circularly symmetric training sequence structure (100) for high-speed communication system. The hieratical pseudo-circularly symmetric part (101) is preferably used for burst detection, coarse frequency and timing error estimation and AGC gain setting. The full circularly symmetric part (102) is preferably used for channel estimation, fine frequency error estimation. The resulting sequence has a very good peak-to-average power (PAPR) property, making it suitable for many applications. The bandwidth efficiency is also improved due to using symmetric sequences.

18 Claims, 6 Drawing Sheets

COST-EFFECTIVE PREAMBLE STRUCTURE FOR HIGH-SPEED COMMUNICATION OF PACKETIZED SYSTEMS

The system, apparatus, and method of the present invention relates to a preamble structure that is both cost-effective and reduces the Peak to Average Power Ratio (PAPR).

Typically, in the packet-based OFDM and other block transmission systems (such as single carrier with guard interval), training sequences are transmitted at the beginning of each packet time-domain and frequency-domain. These training sequences are used by the receiver for time Synchronization (SYNC), frequency offset estimation (FOE), AGC gain setting, timing error estimation and Channel Estimation (CE).

For example, in the regular mode of operation of an MB-OFDM UWB system, a time domain sequence (of length equal to 24 OFDM symbols) is transmitted. This time domain sequence is used for SYNC and FOE. The time domain sequence is followed by a frequency domain sequence (of length equal to 6 OFDM symbols), which is used for CE.

Typically all of these OFDM symbols are separated using a Cyclic Prefix (CP) or Zero Padding (ZP). Their peak-to-average power ratio (PAPR) is also high.

Peak to Average Power Ratio (PAPR) is one of the important measures in the performance of a communications signal. PAPR is the ratio of peak instantaneous signal power, $P_{peak}$, to the average signal power, $P_{ave}$. The importance of the PAPR arises from the fact that practical transmitters (particularly power amplifiers) have a limited linear dynamic range, i.e. if the signal value exceeds a certain limit non-linear distortion is caused. Besides adding noise (distortion) to the desired signal, non-linear distortion will create harmonics of the signal; hence it increases the out-of-band emissions of the transmitter.

To avoid this, the signal must be kept within the linear range of the transmitter. Given a specific value for the PAPR, this limit on the peak value of the signal implies a limit on the average transmitted power. Hence it is beneficial to design signals having a small PAPR value.

The PAPR depends on the modulation Single Carrier, Single Carrier Block Transmission (SCBT) or OFDM, constellation (PSK, QAM) and pulse shape.

In the conventional block transmission method such as OFDM and SCBT, the transmitter transmits a time domain (or sometimes frequency domain) preamble, which is the repetition of an auto-orthogonal sequence separated with CP or ZP. Then a frequency domain sequence (typically designed to have a flat response in the frequency domain) is transmitted. The receiver sequentially performs synchronization, AGC gain setting, frequency offset estimation, timing offset estimation and correction and channel estimation.

While this approach follows a simple paradigm, it requires long preambles, which in turn reduce the bandwidth efficiency of the system. In high rate communication systems it is important to reduce the preamble overhead in order to improve the bandwidth efficiency of the system.

In addition, conventional preambles usually have high peak-to-average power ratio (PAPR). While this may not be a significant consideration for low-power transmitter, high PAPR is a problem for relatively higher power transmitters since the average transmitted power must be less that what is made available by the circuit.

Therefore, a means for achieving a shorter preamble and a smaller PAPR value is needed.

The present invention provides an apparatus, method and system that reduces the preamble overhead by transmitting a preamble comprising K repetitions of a circularly orthogonal sequence.

Figure 1:
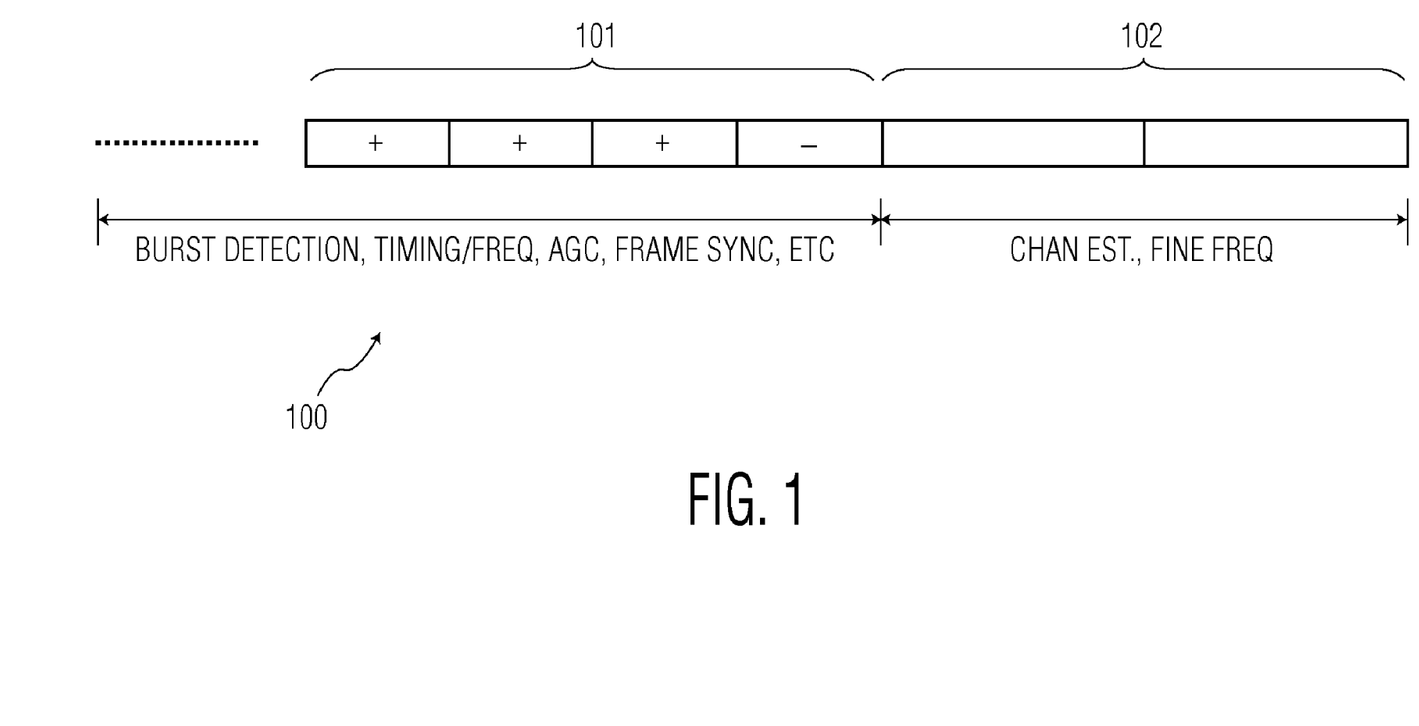
FIG. 1 illustrates a preamble structure using hierarchical CAZAC sequences, according to the present invention.

Referring now to FIG. 1, in the present invention, a hierarchical pseudo-circularly symmetric 101 and full circularly symmetric 102 training sequence structure 100 is provided for high-speed block communication systems.

The training sequence is defined as a sequence of Constant Amplitude Zero Auto Correlation sequences.

The hierarchical pseudo-circularly symmetric part 101 of this training sequence is used for burst detection, coarse-frequency and timing error estimation, and AGC gain setting.

The full circularly symmetric part 102 of this training sequence is used for channel estimation and fine frequency error estimation.

The resulting sequence 100 has very good peak-to-average power ratio (PAPR) making it suitable for many applications. The bandwidth efficiency is also improved due to using symmetric sequences.

Due to its circularly orthogonal property, the preamble 100 does not require a cyclic prefix or a zero pre fix (post fix). This results in improved efficiency.

In addition, the PAPR of the preamble 100 is typically lower by about 3 dB compared to some conventional systems such as those that use PN sequences or 5-9 dB lower compared to those that use frequency-domain sequences. This results in better transmitter efficiency.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

The present invention provides an apparatus, method and system that provides a cost-effective preamble structure for high-speed communication of packetized systems. In a preferred embodiment, the preamble consists of the repetition of a pseudo cyclically orthogonal sequence followed with a full cyclically orthogonal sequence as described below.

Preamble

The preamble 100 is constructed from a constant amplitude zero autocorrelation (CAZAC) sequence that exhibits a circularly orthogonal property. The basic element of the training sequence is $$A(n = p + N*q) = e^{j\left(\frac{2\pi m}{N}pq+\alpha\right)}$$
$$p = 1, \ldots, N$$
$$q = 1, \ldots, N,$$

where m is prime to N, $j=\sqrt{-1}$, $\alpha$ is a phase offset factor, and N is an integer. This results in a sequence of length $N^2$. Examples of the length are 4, 9, 16, 25, 36, etc. While the restriction on length can be considered as a drawback, for most practical applications there is likely a length that is good enough for the application.

The structure of the preamble 100 of a preferred embodiment is shown in FIG. 1. The first part 101 of the preamble 100 is composed of a hierarchical construction (described below) of the above sequence. The signs (+,−) indicate the phases of the individual sequences. Each sequence may have a different phase. This allows transmission of additional information overlaid on the sequence. For example, FIG. 1 shows the one (−). This can be used as a sign of the beginning of the following, but, different sequence. This type of use is normally known as frame sync or frame delimiter. Following this first part of the preamble 101, a second part 102 comprising one or more sequences is transmitted for channel estimation and other purposes. Preferably, this second part 102 need not be an hierarchical sequence. An additional shorter sequence may also be inserted at the end or at the beginning of the second part of the sequence to allow the channel impulse response to one of decay and ramp-up. The length of this shorter sequence is normally equal to the length of the expected delay spread of the channel.

The hierarchical sequence 101 is constructed from two primitive sequences of one of the same and different lengths.

Assuming $A_1$ is of length $L_1$ and $A_2$ is of length $L_2$, a new hierarchical sequence 101 of length $L_1 * L_2$ is constructed from these primitive sequences as $$A = \{A_1(1)A_2, A_1(2)A_2, \ldots, A_1(L_1)A_2\} \text{ which is expanded as follows:}$$

$$A = \{A_1(1)A_2(1), A_1(1)A_2(2), \ldots, A_1(1)A_2(L_2), A_1(2)A_2 \\ (1), A_1(2)A_2(2), \ldots, A_1(2)A_2(L_2), A_1(L_1)A_2(1), A_1 \\ (L_1)A_2(2), \ldots, A_1(L_1)A_2(L_2)\}$$

Figure 5:
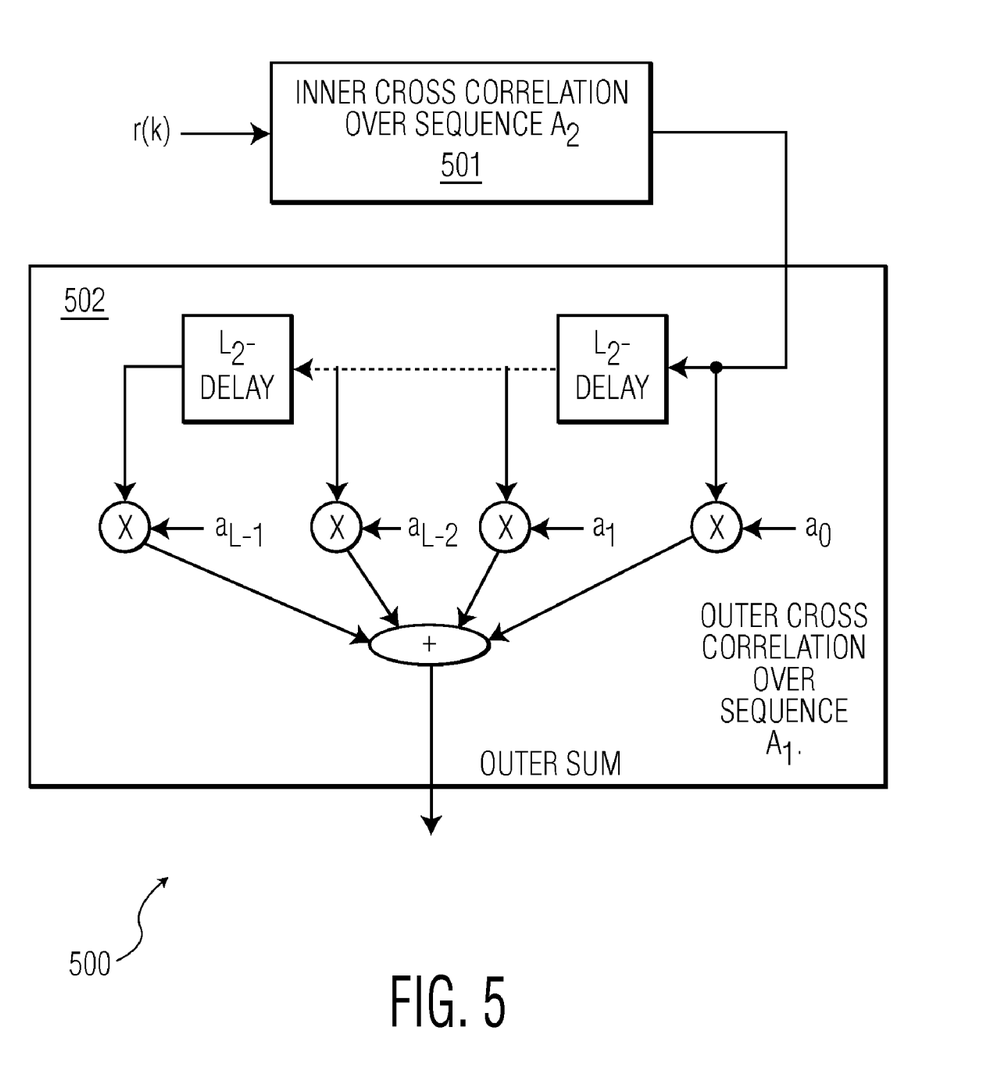
FIG. 5 illustrates an hierarchical cross-correlator.

Referring now to FIG. 5, a preferred low-cost implementation is illustrated of a correlator 500 for the present invention. The preferred correlator is a hierarchical correlator that at a first stage correlates with $A_2$ 501, and then the output of the first stage correlator 501 is passed to a second stage correlator 502 for $A_1$. This reduces the implementation complexity, making it attractive for especially highly demanding very high-speed applications.

The resultant hierarchal sequence 101 has many advantageous properties:
1. The primitive sequence is orthogonal to any cyclic shift of itself This property of the sequence makes it a very good choice for correlation-based synchronization. Furthermore, since the sequence is cyclically orthogonal, there is no need for CP or ZP.
2. The sequence has constant power in time, i.e. $|a_n|=1$. In addition, the peak to average power ratio (PAPR) is lower, e.g., than simple binary type modulation (BPSK). This property of the sequence allows transmission of the preamble at higher power, without incurring power amplifier non-linearity problems.
3. The primitive sequence has N constellation points. Based on a proper choice of N, the sequence values can be made to include only binary numbers. For example, N=4 results in the following sequence. [1i −1 −1i 1 −1 1 −1 1 −1i −1 1i 1 1 1 1 1]. This simplifies implementation both at a transmitter and a receiver. Only 1 bit values are used for correction at the receiver and the transmitter.
4. The magnitude of the DFT of the primitive sequence is unity with the phases taking on one of the $N^2$ distinct values. This property enables sensing of the channel across the whole bandwidth by performing a simple correlation in the frequency domain.

Simulation Results

In order to evaluate the performance of the system, simulations were performed using the following assumptions:
Frequency offset=2.4 MHz
Sampling rate=1.4 GHz
Channel=random exponentially decaying channel with 7.5 ns rms delay spread These parameters closely resemble what would be needed for wireless high-speed communications at 60 GHz. The simulation results are illustrated in FIGS. 2-4.

Figure 2:
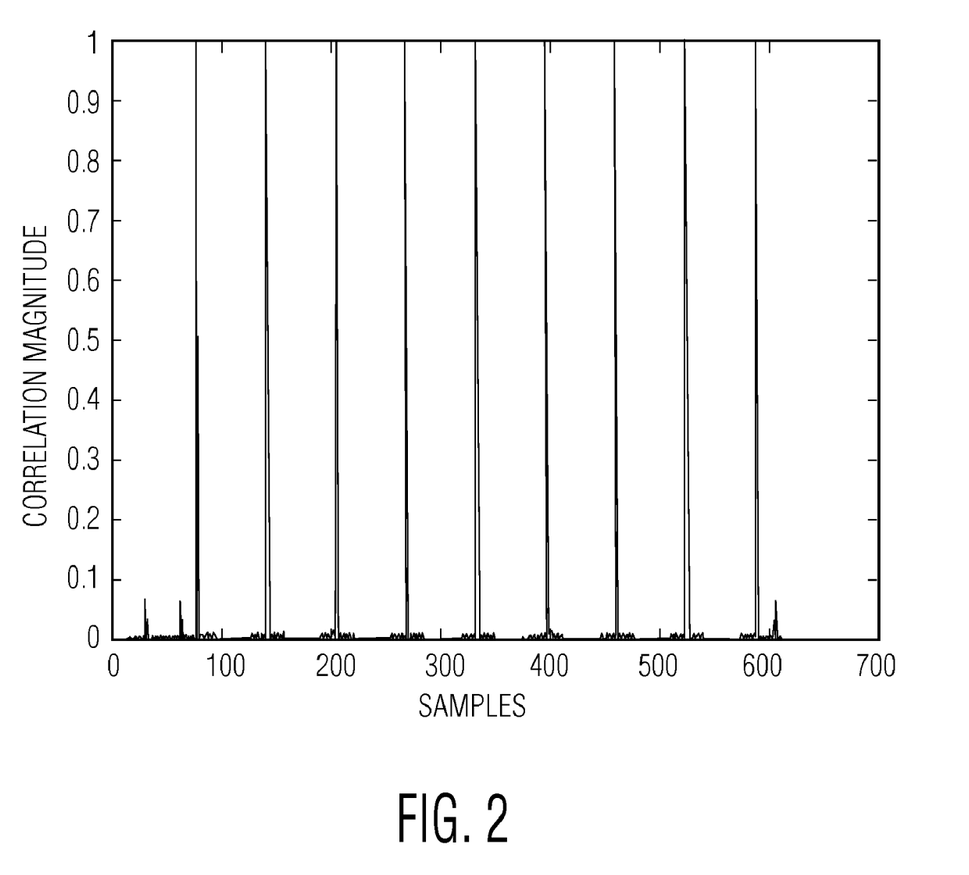
FIG. 2 illustrates correlation output for a (16×4) hierarchical sequence.

FIG. 2 illustrates a cross correlation of the preamble subject to the above impairments with one unit of the preamble. In this case, there are 9 Hierarchical preambles, each of 64 samples, cascaded one after the other. Each of the hierarchical preambles is constructed from 4 and 16 primitive preambles as described above. This preamble sequence is then correlated with one preamble. FIG. 2 illustrates 9 very distinct peaks as expected. In addition, FIG. 2 also shows very small side lobes. The rather small side lobes are a result of the hierarchical construction. On the other hand, the cross correlation of each primitive would be mathematical zero everywhere, except at the end points and at the points that they match.

Figure 3:
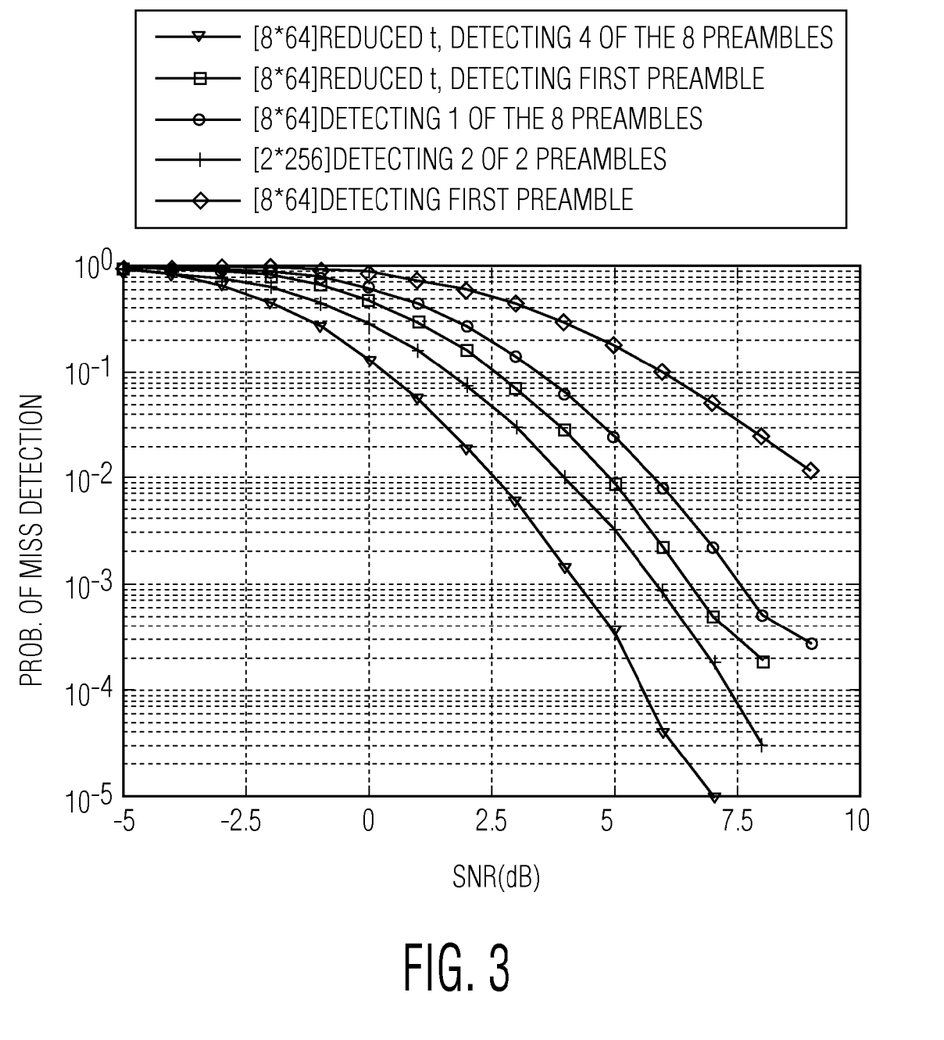
FIG. 3 illustrates performance of the sync detector for various preamble sequence configurations and threshold (t) of detection.

FIG. 3 illustrates probability of detection of the several configurations of the preambles and the detection mechanism.

Figure 4:
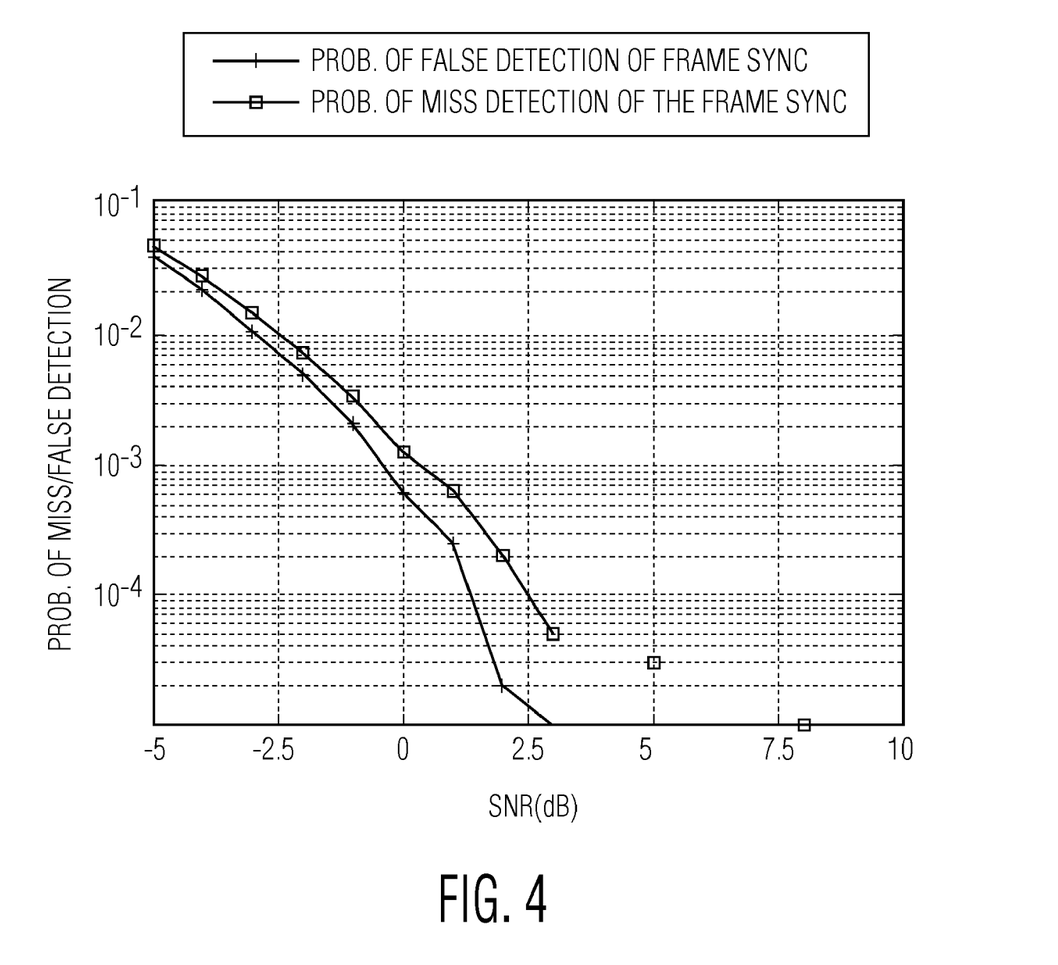
FIG. 4 illustrates performance of the frame sync (frame delimiter) detector.

FIG. 4 illustrates the performance of the frame-delimiter detector.

Among others, the present invention is applicable to packetized high-speed transmissions such as UWB and 60 GHz.

Figure 6:
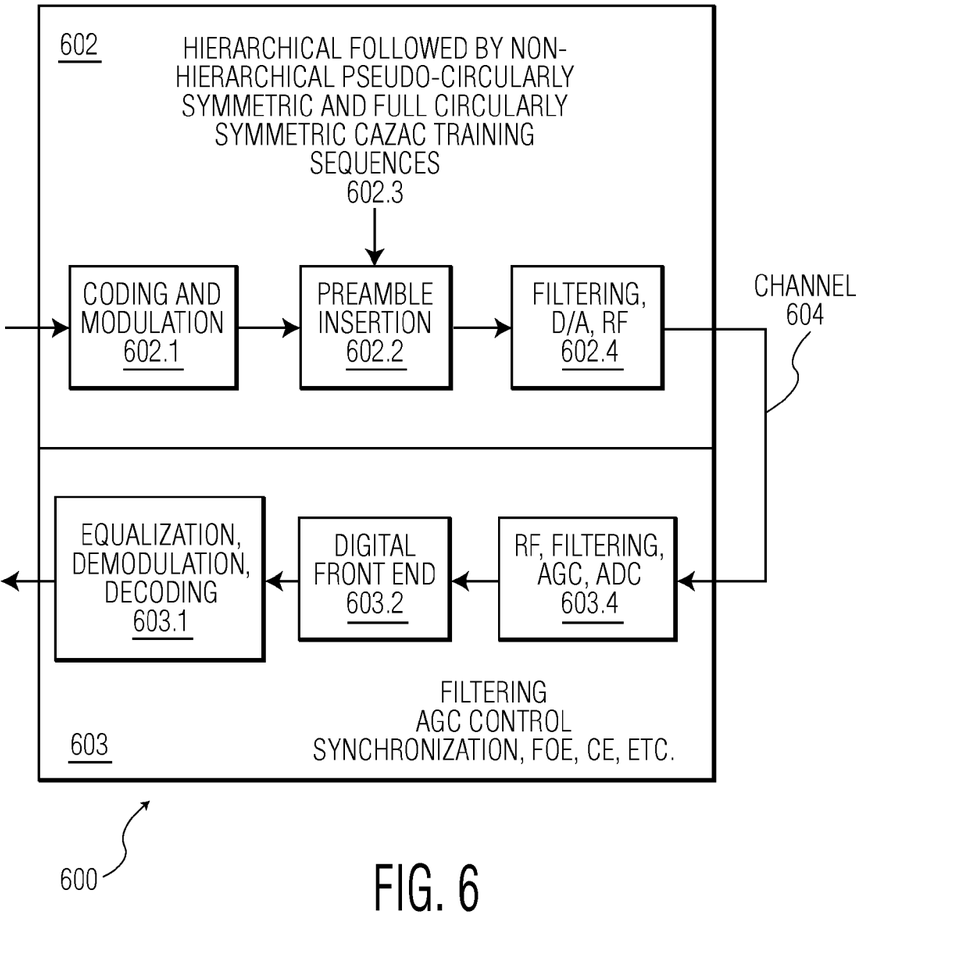
FIG. 6 illustrates a transceiver comprising a transmitter and a receiver modified according to the present invention.

FIG. 6 illustrates a preferred embodiment of a transceiver 600 comprising a transmitter 602 and a receiver 603. The transmitter 602 further comprises a coding and modulation component 602.1 whose output is input to a preamble insertion module 602.2 that inserts hierarchical followed by non-hierarchical pseudo-circularly symmetric and full circularly symmetric CAZAC training sequences, according to the present invention. After insertion of the preamble according to the present invention, the signal is filtered, DA converted and transmitted over the channel 604 by module 602.4. A signal including a preamble according to the present invention is received by receiver 603 modified according to the present invention and comprising a module for filtering AGC control, etc. 603.4 of the received signal and providing an output signal to a digital front end 603.2 which further processes the signal.

Figure 7:
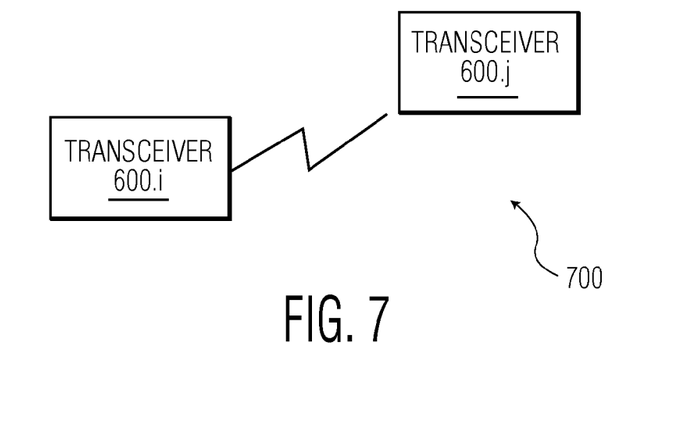
FIG. 7 illustrates a communication system modified according to the present invention.

FIG. 7 illustrates a communication system comprising transceivers 700 according to the present invention, that transmit and receive messages comprising a preamble structure using hierarchical CAZAC sequences, according to the present invention.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto as well as all implementation techniques an not just the object oriented approach to implementation used as an example.

We claim:

1. A block transmission wireless communication system, comprising:
   a preamble including at least one repetition of a two-part training sequence, said preamble generated without components selected from the group consisting of a cyclic prefix, a zero prefix, and a zero post-fix, wherein the two-part training sequence comprises: a first part having a hierarchical pseudo-circularly symmetric sequence structure; and a second part having full circularly symmetric training sequence structure;
   a transmitter that transmits said preamble and the two-part training sequence included therein at the beginning of each of a block time-domain and a block frequency-domain; and
   a receiver that responds to the training sequence for performing time synchronization (SYNC), frequency offset estimation (FOE), AGC gain setting, timing error estimation, and channel estimation (CE),
   wherein the block transmission in the wireless communication system comprises packet-based OFDM transmission,
   wherein the two-part training sequence is generated as a sequence of a plurality of primitive sequences that exhibit circular orthogonality and that are defined as:

$$A(n = p + N*q) = e^{j\left(\frac{2\pi m}{N}pq+\alpha\right)},$$
$$p = 1, \ldots, N,$$
$$q = 1, \ldots, N,$$

where A(n) is a coefficient of a primitive sequence, m is prime to N, $j=\sqrt{-1}$, α a is a phase offset factor, and N is an integer which results in a sequence of length $N^2$, wherein the length $N^2$ includes 4, 9, 16, 25, and 36.

2. The system of claim 1, wherein:
   the receiver is responsive to the first part for performing burst detection, coarse-frequency and timing error estimation, and AGC gain setting; and
   the receiver is responsive to the second part for performing channel estimation and fine frequency error estimation.

3. The system of claim 2, wherein the first part is constructed from two primitive sequences $A_1$ and $A_2$ having a respective length $L_1$ and $L_2$ selected from the group consisting of the same length and different lengths, said first part having a length $L_1*L_2$ and being constructed from said primitive sequences as:

$$A=\{A_1(1)A_2, A_1(2)A_2, \ldots, A_1(L_1)A_2\}.$$

4. The system of claim 3, wherein each primitive sequence has N constellation points chosen such that a value of the sequence includes only binary numbers, wherein only 1 bit values are used for correction at the receiver and the transmitter.

5. The system of claim 4, wherein an additional shorter sequence one of precedes the second part and follows the second part such that a channel impulse response behaves in a manner selected from the group consisting of decay and ramp-up.

6. The system of claim 5, wherein a length of the shorter sequence is equal to a length of an expected delay spread of a channel over which the preamble is transmitted by the transmitter.

7. A method for transmitting blocks in a wireless communication system, comprising:
   generating a preamble that includes at least one repetition of a two-part training sequence, said preamble generated without components selected from the group consisting of a cyclic prefix, a zero prefix, and a zero post-fix, wherein generating the preamble including at least a two-part training sequence further comprises the steps of: generating a first part of the two-part training sequence having a hierarchical pseudo-circularly symmetric sequence structure; and generating a second part of the two-part training sequence having full circularly symmetric training sequence structure;
   transmitting the generated preamble and the two-part training sequence included therein at the beginning of each of a block time-domain and a block frequency-domain; and
   in response to the transmitted training sequence, performing, at a receiver, time synchronization (SYNC), frequency offset estimation (FOE), AGC gain setting, timing error estimation and channel estimation (CE);
   wherein the blocks are transmitted in the wireless communication system in accordance with packet-based OFDM transmission,
   wherein the two-part training sequence is generated as a sequence of a plurality of primitive sequences that exhibit circular orthogonality and that are defined as:

$$A(n = p + N*q) = e^{j\left(\frac{2\pi m}{N}pq+\alpha\right)}$$
$$p = 1, \ldots, N$$
$$q = 1, \ldots, N,$$

where A (n) is a coefficient of a primitive sequence, m is prime to N, $j=\sqrt{-1}$, α is a phase offset factor, and N is an integer which results in a sequence of length $N^2$, wherein the length $N^2$ includes 4, 9, 16, 25, and 36.

8. The method of claim 7, wherein the performing at the receiver further comprises:
   responding to the first part for performing burst detection, coarse-frequency and timing error estimation, and AGC gain setting; and
   responding to the second part for performing channel estimation and fine frequency error estimation.

9. The method of claim 8, further comprising constructing the first part from two primitive sequences $A_1$ and $A_2$ having a respective length $L_1$ and $L_2$ selected from the group consisting of the same length and different lengths, said first part having a length $L_1*L_2$ and being constructed from said primitive sequences as $$A=\{A_1(1)A_2, A_1(2)A_2, \ldots, A_1(L_1)A_2\}.$$

10. The method of claim 9, further comprising for each primitive sequence, choosing N constellation points such that a value of the primitive sequence includes only binary numbers, wherein only 1 bit values are used for correction at a receiver and a transmitter.

11. The method of claim 10, further comprising inserting an additional shorter sequence at one of prior to the second part and after the second part such that a channel impulse response behaves in a manner selected from the group consisting of decay and ramp-up.

12. The method of claim 11, wherein a length of the inserted shorter sequence is equal to a length of an expected delay spread of a channel over which the preamble is transmitted by the transmitting.

13. A transmitter apparatus for block transmission wireless communication, comprising:

a preamble generated to include at least one repetition of a two-part training sequence, said preamble generated without components selected from the group consisting of a cyclic prefix, a zero prefix, and a zero post-fix, wherein the two-part training sequence comprises: a first part having a hierarchical pseudo-circularly symmetric sequence structure; and a second part having full circularly symmetric training sequence structure;

a preamble insertion module that inserts said preamble and the two-part training sequence included therein, at the beginning of each of a block time-domain and a block frequency-domain, wherein block transmission in the wireless communication system is performed by packet-based OFDM transmission, wherein the two-part training sequence is generated as a sequence of a plurality of primitive sequences that exhibit circular orthogonality and that are defined as:

$$A(n = p + N*q) = e^{j\left(\frac{2\pi m}{N}pq+\alpha\right)}$$
$$p = 1, \ldots, N$$
$$q = 1, \ldots, N,$$

where A(n) is a coefficient of a primitive sequence, m is prime to N, $j=\sqrt{-1}$, $\alpha$ is a phase offset factor, and N is an integer which results in a sequence of length $N^2$, wherein the length $N^2$ includes 4, 9, 16, 25, and 36.

14. The apparatus of claim 13, wherein:
the first part is used by a receiver for performing burst detection, coarse-frequency and timing error estimation, and AGC gain setting; and
the second part is used by a receiver for performing channel estimation and fine frequency error estimation.

15. The apparatus of claim 14, wherein the first part is constructed from two primitive sequences $A_1$ and $A_2$ having a respective length $L_1$ and $L_2$ selected from the group consisting of the same length and different lengths, said first part having a length $L_1*L_2$ and being constructed from said primitive sequences as $$A=\{A_1(1)A_2, A_1(2)A_2, \ldots, A_1(L_1)A_2\}.$$

16. The apparatus of claim 15, wherein each primitive sequence has N constellation points chosen such that a value of the sequence includes only binary numbers, wherein only 1 bit values are used for correction at the receiver and the transmitter.

17. The apparatus of claim 16 wherein an additional shorter sequence is one of inserted prior to the second part and after the second part such that a channel impulse response behaves in a manner selected from the group consisting of decay and ramp-up.

18. The apparatus of claim 17, wherein a length of the shorter sequence is equal to a length of an expected delay spread of a channel over which the preamble is transmitted by the transmitter.

* * * * *